US012651913B2

(12) United States Patent
DeLong et al.

(10) Patent No.: US 12,651,913 B2
(45) Date of Patent: Jun. 9, 2026

(54) MOBILE DEVICE CHARGING FROM A VEHICLE BASED ON COMMUNAL ASSOCIATION

(71) Applicant: FORD GLOBAL TECHNOLOGIES, LLC, Dearborn, MI (US)

(72) Inventors: Aaron M. DeLong, Toledo, OH (US); John R. Van Wiemeersch, Novi, MI (US); Vivekanandh Elangovan, Canton, MI (US); Mahmoud Y. Ghannam, Canton, MI (US)

( * ) Notice: Subject to any disclaimer, the term of this patent is extended or adjusted under 35 U.S.C. 154(b) by 322 days.

(21) Appl. No.: 18/500,165

(22) Filed: Nov. 2, 2023

(65) Prior Publication Data

US 2025/0149902 A1    May 8, 2025

(51) Int. Cl.
| | |
|---|---|
| *H02J 7/42* | (2026.01) |
| *H02J 7/14* | (2006.01) |
| *H02J 7/47* | (2026.01) |
| *H02J 7/90* | (2026.01) |

(52) U.S. Cl.
CPC .............. *H02J 7/42* (2026.01); *H02J 7/1446* (2013.01); *H02J 7/47* (2026.01); *H02J 7/971* (2026.01); *H02J 2207/10* (2020.01)

(58) Field of Classification Search
CPC ............. H04B 5/79; H04W 4/80; H04W 4/40
See application file for complete search history.

(56) References Cited

U.S. PATENT DOCUMENTS

| | | | |
|---|---|---|---|
| 10,035,494 B2 | 7/2018 | Sute | |
| 10,931,150 B2 | 2/2021 | Elangovan et al. | |
| 2018/0154866 A1* | 6/2018 | Sute ......................... | H02J 50/12 |
| 2018/0175672 A1* | 6/2018 | Yoden ...................... | H02J 50/80 |
| 2018/0351388 A1* | 12/2018 | Orris ........................ | B60R 16/03 |
| 2022/0254206 A1* | 8/2022 | Dykstra ................... | G07C 9/27 |
| 2023/0085960 A1 | 3/2023 | Caglayan et al. | |
| 2023/0344278 A1* | 10/2023 | Glover .................... | H02J 50/40 |
| 2025/0015619 A1* | 1/2025 | Wobak .................. | H02J 7/0048 |

FOREIGN PATENT DOCUMENTS

| | | |
|---|---|---|
| DE | 102021115087 A1 | 12/2022 |
| WO | 2016180600 A1 | 11/2016 |

* cited by examiner

*Primary Examiner* — Wen W Huang
(74) *Attorney, Agent, or Firm* — Frank Lollo; Eversheds Sutherland (US) LLP

(57) ABSTRACT

A motor vehicle provides wireless charging to a mobile wireless device outside of the vehicle. After a request by a person outside the vehicle, a wireless power transmitter initiates remote charging of the mobile wireless device. A vehicle controller is configured to respond to the charging request by (A) attempting one or more times to communicate with the mobile wireless device until a link is established, (B) before the link is established then activating the wireless power transmitter to remotely charge the mobile wireless device, (C) when the link is established then determining whether the mobile wireless device corresponds to a pre-established communal group, and (D) deactivating the wireless power transmitter when the mobile wireless device does not correspond to a pre-established communal group. Consequently, the power reserve in a vehicle battery is protected against depletion.

20 Claims, 4 Drawing Sheets

Charging Request 55

Localize 56

Normal Wireless Link? 57

Activate Low Power Link 58

Response? 59

Turn ON Generic Power Transfer 60

Able To Obtain ID? 61

Other Group Type? 66

Stop 67

Authenticated? 62

Charge And/Or Grant Acess 63

Obtain Group 64

Update Power Transfer Parameters 65

Group IDs 71

Group Members 72

Admin 70

User 73

Mobile 74

MOBILE DEVICE CHARGING FROM A VEHICLE BASED ON COMMUNAL ASSOCIATION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to charging of mobile wireless devices from a vehicle, and, more specifically, to controlling access to a vehicle-mounted charger.

Mechanical keys traditionally used for unlocking access doors to motor vehicles and for unlocking a steering wheel and starting a propulsion unit (e.g., internal combustion engine or electric vehicle powertrain) have been gradually replaced by passive and active electronic devices. Active devices include key fobs and smartphones (e.g., Phone-as-a-Key) with self-contained power supplies. In addition, passive devices including transponders are also used, such as near-field communication (NFC) cards.

Phone-as-a-key (PaaK) technology uses a wireless mobile device (e.g., cellular smartphone) to access vehicle functions that have been traditionally secured using a physical key or a dedicated wireless key fob. For PaaK, there may be a smartphone app that is downloaded and configured to direct secure communications with the vehicle to enable a user to access functions such as vehicle locking/unlocking, engine starting, courtesy lighting, and others. An example of a Phone-as-a-Key system is shown in U.S. Pat. No. 10,244, 476B2, entitled "Reducing Power Consumption For Phone As A Key (PAAK) System," issued Mar. 26, 2019, which is incorporated herein in its entirety. As used herein, "mobile device" refers to any wireless unit capable of remote control of a vehicle function, wherein the wireless unit is handheld and contains a display, a transmit/receive antenna, and a rechargeable battery. In addition to a smartphone, mobile devices may include, without limitation, a smart watch (such as an Apple® watch) and a dedicated vehicle key fob with or without a display.

On the vehicle side, there may be several different electronic controllers handling the functions to be accessed by a PaaK system. Likewise, there may be one or more wireless receivers in the vehicle that would need to be accessible to the mobile device, wherein the wireless receivers may operate using several different wireless services, networks, or protocols. The types of wireless communication to be used by a PaaK system may include Wi-Fi, Bluetooth® (e.g., Bluetooth Low Energy, or BLE), cellular, ultra-wideband (UWB), near-field communication (NFC), Wireless Charging (e.g., Qi®, WattUp®, or Cota®), or others.

Mobile devices, such as cell phones, watches, and digital cameras typically employ rechargeable batteries that must be periodically recharged. Conventionally, these electronic devices have been charged using a physical connection to an electrical charger via a wire. More recently, wireless charging devices such as inductive chargers have become available to charge the battery without any physical wire connection between the mobile electronic device and a charging device. Inductive chargers may be used which generate a magnetic field through the use of inductive coils in order to transfer the electric energy from the charging device to a receiver on a battery or in the mobile device. Inductive chargers have been proposed for use on vehicles in various locations within the cockpit of the vehicle, typically near the driver and other passengers, for the sake of convenience to allow easy access to the devices.

Industry standards for wireless inductive charging have been defined, which has led to increasing availability of wireless chargers and the mobile devices that use them. For instance, a popular wireless charging solution is known as Qi® charging technology which has been deployed in vehicles by providing a charging surface within a storage bin (e.g., in a center console between left and right front seats). Longer range charging systems such as WattUp® charging from Energous Corporation and Cota® wireless power from Ossia Incorporated can enable a vehicle-mounted charger to deliver charging to mobile devices residing outside of the vehicle.

The Phone-as-a-Key (PaaK) feature can be hampered if the phone battery becomes depleted or is too low for the phone to function, potentially impeding vehicle access and starting. When the cell phone battery is substantially depleted, there is even the potential that an integrated NFC function would also not work. A charging interface on an exterior surface of the vehicle (such as a Qi® charging pad) could enable a user to overcome a depleted phone battery, but would add substantial cost for something that would not be used very often. Furthermore, it may be undesirable to allow anyone with access to the vehicle exterior to utilize the vehicle as a charging source since this could deplete reserve battery power of a vehicle battery needed for operation and startup.

SUMMARY OF THE INVENTION

According to one aspect of the invention, a vehicle provides wireless charging to a mobile wireless device outside of the vehicle. A perimeter interface is responsive to a request action by a person outside the vehicle to initiate charging of the mobile wireless device. A wireless power transmitter is configured to remotely charge the mobile wireless device. A wireless transceiver is configured to provide a wireless communication link with the mobile wireless device. A controller is configured to respond to the request action detected by the perimeter interface by (A) attempting one or more times to communicate with the mobile wireless device until a link is established, (B) before a link is established then activating the wireless power transmitter to remotely charge the mobile wireless device, (C) when a link is established then determining whether the mobile wireless device corresponds to a pre-established communal group, and (D) deactivating the wireless power transmitter when the mobile wireless device does not correspond to a pre-established communal group.

DETAILED DESCRIPTION OF PREFERRED EMBODIMENTS

Figures 1, 2:
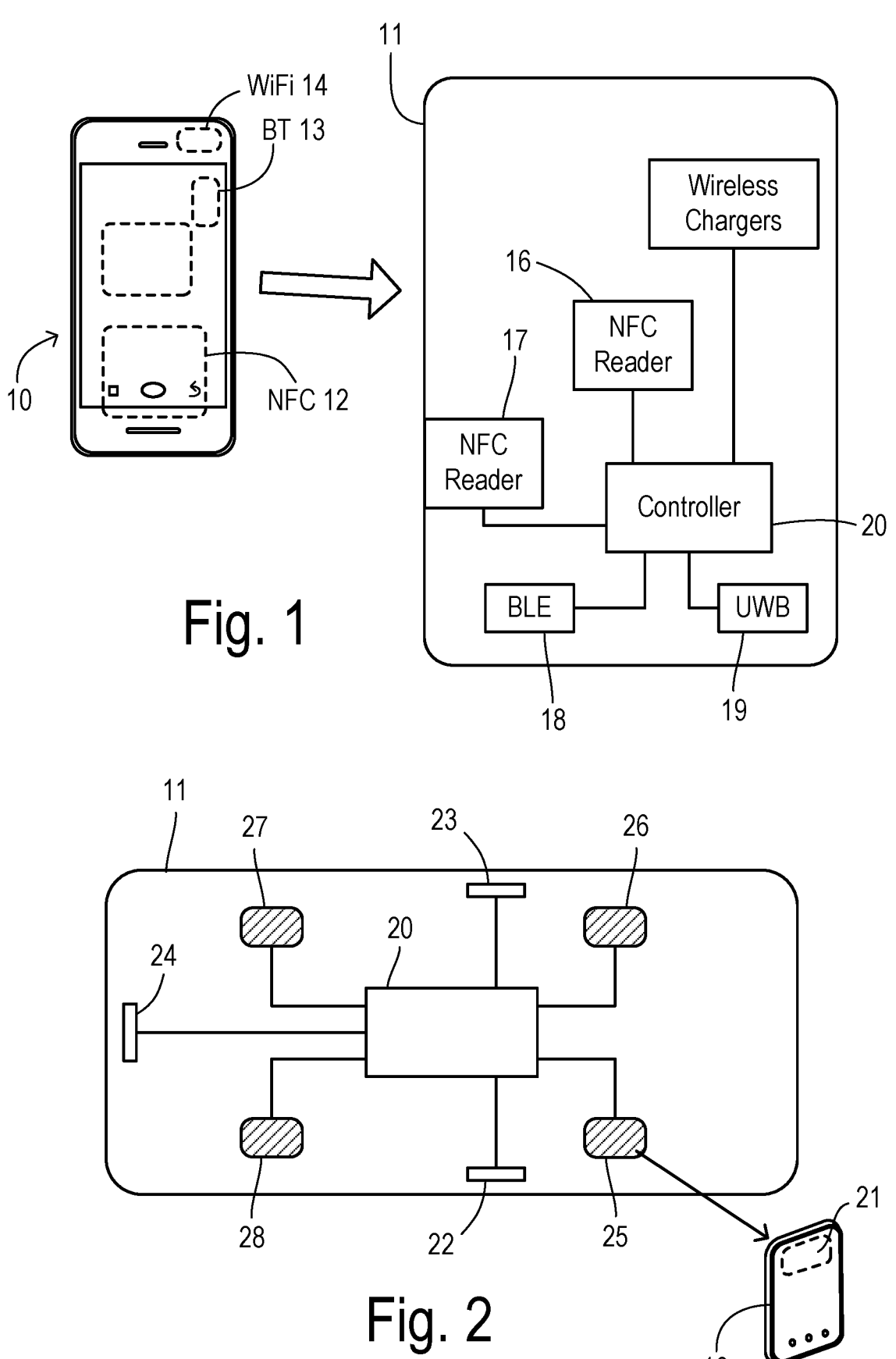
FIG. 1 is a block diagram showing portions of a vehicle security system and a mobile wireless device for authenticating a user.
FIG. 2 is a block diagram showing wireless transmitters on a vehicle capable of transferring charging energy to a mobile wireless device.

Exterior charging of a mobile wireless device (e.g., a smartphone) from a vehicle can be based on either (1) special-purpose components installed on a vehicle and/or a mobile device (e.g., WattUp® and/or Cota® hardware and software) or (2) harvesting of energy from pre-existing vehicle transmitters (e.g., Bluetooth®, Wi-Fi, UWB, or cellular). The exterior charging can be invoked by a user when a mobile device for accessing the vehicle has a depleted battery. In this way, the mobile device receives energy from the vehicle wirelessly and stores up enough charge to either power up the device fully or power it up into a low-power/reserve-power mode. Once it become active, the mobile device can then be localized and authenticated by the vehicle so that the user can gain access to and/or start the vehicle.

A vehicle user may experience a depleted mobile device battery. When the user approaches vehicle, they may be unable to access or start the vehicle. The invention enables the user to trigger an external charging system by performing a request action detected by a perimeter interface of the vehicle. For example, the user may touch or pull a car door handle, press a button or sequence of buttons on an exterior vehicle keypad, press a liftgate/trunk release switch, utter a voice command picked up by an external microphone, or perform a physical gesture picked up by an external camera.

The vehicle may be equipped with long range charging technology, such as WattUp® or Cota®. The user's mobile device receives energy and builds up a charge. The long-range charging technology may utilize an antenna array wherein a charging signal is concentrated in a certain direction to achieve high efficiency charging. The peripheral interface may localize the user carrying the mobile device (e.g., based on which door handle is triggered) so that the charger can transmit the energy in the corresponding direction.

In some embodiments, charging energy may be generated using RF transmitters in the vehicle such as BLE, Wi-Fi, UWB, and/or cellular transmitters. The mobile device can harvest the energy from these RF radios to build a charge. To facilitate faster charging, the vehicle may increase an "on" time or duty cycle of these radios and/or increase the transmit power temporarily. Power consumption may be optimized by turning on only the RF transmitters near where the user triggered the request. For example, if the user triggered at the driver door, then the RF transmitters near the driver door are activated.

Before activating the long-range charger or the RF transmitters, the vehicle may attempt to authenticate the mobile device. When the mobile device is depleted, however, it will likely be unable to communicate using typical methods. But, if the device supports backscatter communication, passive NFC, or other battery-free communication then it may be able to respond to vehicle authentication challenges even before it harvests a substantial amount of energy. Once authenticated via this method, the vehicle would proceed to charge the mobile device in an unrestricted manner. This type of authentication could be vulnerable to relay attacks, so it would not be desirable to use it for granting vehicle access. Vehicle access could be obtained once the mobile device becomes sufficiently charged to interact in the normal way over a two-way wireless communication link such as BLE.

Any mobile devices in the vicinity of the vehicle may obtain a small amount of recharging energy in order to enable a basic communication with the vehicle. Once a sufficient level of charge is achieved to a normal BLE, Wi-Fi, or other communication link, changing may terminate unless the mobile device is recognized by the vehicle in some way. Recognition may include specific authentication of a previously known mobile device (e.g., the smartphone of the vehicle owner) or a recognition of a member of a communal group in a "Good Samaritan" mode. Parameters of charging, such as duration of charging, may be limited according to particular communal groups or other factors. By restricting the availability of charging beyond the small amount of charge needed to enable basic communication to known mobile devices and members of a predetermined communal group, the reserve energy stored in a vehicle battery can be protected from undesired depletion.

The vehicle may provide the owner or other authorized user access to a set-up menu to define restrictions according to selected communal groups and/or unrecognized mobile devices, such as time limits and/or conditions under which it may allow extended charging of unrecognized devices (e.g., only at certain GPS locations, only certain times of the day, or only if the state-of-charge of the vehicle storage battery is above a threshold). The threshold may be dynamic based on how far the vehicle is from its home base.

A communal group for the "Good Samaritan" mode may include, without limitation, any organization or assemblage of persons or mobile devices which can be labeled using a group identifier. Examples of a communal group include owners of vehicles made by the same manufacturer, members of a social club, employees or agents of a business, or any arbitrarily defined set of persons (including any and all phones, at least in some circumstances). For recognition in the "Good Samaritan" mode, a communal group may be assigned a communal group ID which is distributed to the vehicles and to any mobile devices for which it is desired to provide the desired charging access. In the case of a communal group comprised of the mobile devices and vehicles associated with users who are owners of a vehicle made by a particular manufacturer, the communal group ID can be established by the vehicle manufacturer to be used by each vehicle owner to access mobile device chargers installed on any vehicle made by that manufacturer. One manner of establishing such a communal group ID is for the vehicle manufacturer to program the BLE transmitters of their vehicles to embed a universal unique identifier (UUID) within the Bluetooth® communication signals, wherein the UUID is unique to the manufacturer.

Referring to FIG. 1, a wireless mobile device 10 operates as a remote security key for a vehicle 11. Mobile device 10 is shown as a smartphone incorporating various wireless technologies including several short-range systems requiring respective antennas. Depending upon a particular design of the different types of mobile devices, several different radio transceivers with respective antennas may be included in the device. For example, mobile device 10 includes an NFC antenna 12, Bluetooth® antenna 13, Wi-Fi antenna 14, and Qi® charging antenna 15.

Vehicle 11 includes an NFC reader 16 disposed in an interior passenger cabin of vehicle 11 and an NFC reader 17 disposed in an exterior surface of vehicle 11. NFC reader 17 is positioned to enable a user outside the vehicle to utilize their mobile device 10 to unlock an entry door and gain access to vehicle 11. NFC reader 16 is accessible from within vehicle 11 to enable a user to access various vehicle functions, such as turning the vehicle ON (e.g., start its engine and engaging the transmission). NFC readers 16 and 17 are connected to a controller 20 for managing the security functions. Proper operation of the NFC communication link may require a sufficient charge level of a battery contained in mobile device 10. Vehicle 11 may further include a Bluetooth® Low Energy (BLE) transceiver 18 and an ultra-wideband (UWB) transceiver 19 for establishing respective communication links with mobile device 10.

As shown in FIG. 2, mobile device 10 includes a power harvesting circuit 21 for collecting energy via RF radiation impinging on one or more antennas in mobile device 10. The collected energy is used to recharge an internal battery (not shown). Vehicle 11 is used as a source of RF radiation which may be predominantly emitted in a particular direction corresponding to the location of mobile device 10. Vehicle 11 includes a perimeter interface which may be comprised of perimeter sensors 22-24 connected to controller 20 which are dispersed at respective sides of vehicle 11 to localize mobile device 10 and/or the user carrying mobile device 10 who initiates a charging event. Sensors 22-24 may be comprised of contact switches mounted on door handles, cameras for capturing images of a user, microphones for detecting utterances by a user, ultrasonic object-detection sensors, or others. RF transmitters 25-28 are dispersed at respective positions on vehicle 11 and are coupled to controller 20 which selectively activates one or more transmitters 25-28 according to a relative location of mobile device 10 when it is desired to emit RF radiation for the purpose of charging mobile device 10. Typically RF transmitters 25-28 are included in transceivers which also receive RF signals.

Figures 3, 4:
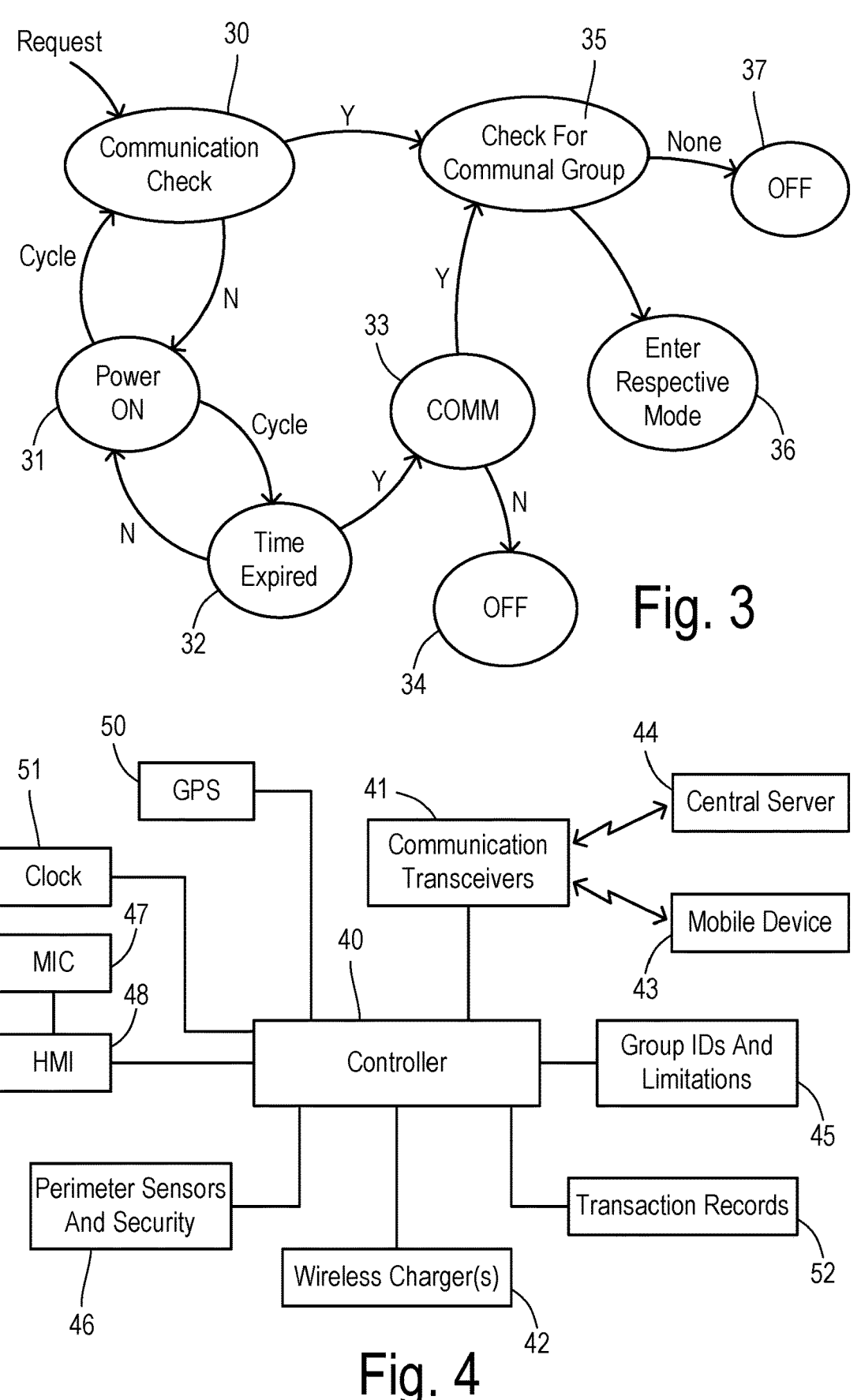
FIG. 3 is a state diagram showing one preferred embodiment for making charging energy available from a vehicle to mobile wireless devices.
FIG. 4 is a block diagram showing one preferred embodiment of the invention in greater detail.

FIG. 3 shows a state diagram according to one embodiment of the invention. After a charging request is initiated by a person possessing a mobile device in the vicinity of the vehicle (e.g., using a predetermined sequence of door-contact switch activations), a state 30 is entered for performing communication checks. The communication check in state 30 may be comprised of two-way RF communication as used with the mobile device for normal security operations (e.g., using BLE, Wi-Fi, or NFC communication). If the vehicle transceivers for the normal security operations fail to establish a link with the mobile device, then a transition is made to a charging state 31 in which power is applied to a wireless power transmitter (e.g., a dedicated remote charger such as WattUp® or Cota® or an RF radio transmitter such as BLE). Activation of charging in state 31 is intended to permit a fully depleted mobile device to receive enough charge to conduct an authentication to determine whether continued charging should be permitted. At a predetermined repetition rate, the method cycles back to state 30 to repeat the communication check. In addition, the method periodically cycles to a state 32 in which a check is performed to determine whether the anonymous charging in state 31 has been activated for greater than a predetermined time period. It not, then charging continues in state 31. If the predetermined time period has expired, then a final communication check is performed in a state 33. If no communication link has been established with the mobile device, then charging is turned off in a state 34.

When a communication link is established in either state 30 or state 33, an attempt is made in a state 35 to identify a communal group to which the mobile device belongs. If none is found, then charging is turned off in a state 37. If a communal group is found, then a charging mode corresponding to the identified communal group is entered at a state 36. The particular charging mode may be defined according to predetermined parameters corresponding to the communal group such as charging duration, transmit power level, or actions to obtain renumeration or payment for the charging.

FIG. 4 is a block diagram showing a preferred embodiment in greater detail. Controller 40 is coupled to communication transceivers 41 and to wireless chargers 42 either of which can be activated to remotely charge a mobile device 43. Mobile device 43 is further configured to conduct various communication with controller 40 via RF communication transceivers 41. Transceivers 41 are further configured to communicate with a central server 44 which may provide administration and storage for communal group information such as group identifiers and, in some cases, for keeping track of mobile devices which are members of communal groups. The vehicle has a data memory 45 containing selected group IDs and corresponding charging limitations under supervision and use by controller 40, wherein the contents of memory 45 are set up in coordination with central server 44.

Charging requests generated by a user carrying a mobile device can be triggered using perimeter sensors and security system 46 or by spoken utterances received by a microphone 47 which is connected to controller 40 via a human machine interface (HMI) 48. In some instances, controller 40 may grant access to the charging feature to a mobile device based on an anonymous communal group because of other circumstances in which the vehicle user desires to provide open availability for charging. For example, a GPS receiver 50 may be used to determine that a vehicle is parked at a user's home garage or other location where the user is confident that only certain acceptable persons would attempt to utilize the vehicle as a charging source. A clock 51 coupled to controller 40 may provide time and day information which may provide alternative indicators for a situation in which the vehicle user wishes to provide open charging availability.

In some circumstances, a vehicle user may expect payment or other compensation in connection with providing a recharging function for a mobile device user. Transaction records 52 are generated by controller 40 in order to effectuate such compensation.

Figures 5, 6:
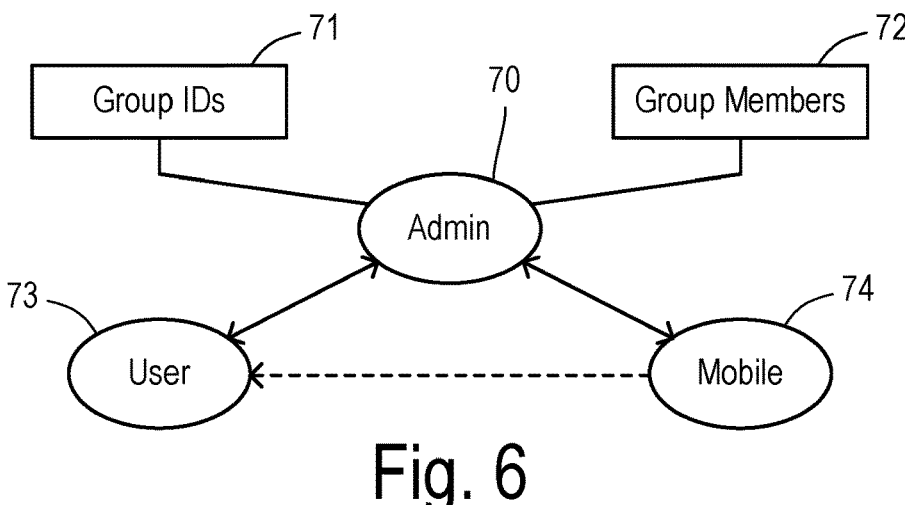
FIG. 5 is a flowchart showing one preferred method of the invention.
FIG. 6 is a block diagram showing administration of group IDs.

FIG. 5 shows a flowchart of one embodiment of the invention wherein a mobile device user initiates a charging request in step 55. In step 56, the sensors of the vehicle perimeter interface localize the user or mobile device. A check is performed in step 57 to determine whether a normal wireless link can be established with the mobile device. If not, then an attempt is made in step 58 to activate a low-power communication link such as backscatter communication. A check is performed in step 59 to determine whether there is any response to the low-power communication link. If not, then a generic power transfer may be turned on in step 60 in order to provide RF emissions directed to the localized mobile device in order to charge the mobile device sufficiently to establish a communication link. Then a return is made to step 57.

Whenever a wireless link is obtained at step 57 or step 59, then a check is performed in step 61 to determine whether it has been possible to obtain any ID using the communication link (e.g., either a specific user ID or a communal group ID). If so, then a check is performed in step 62 to determine whether a particular individual is authenticated who is registered to the vehicle security system. If authenticated, then further unrestricted access to remote charging is enabled and/or actual access to the vehicle (e.g., by unlocking doors and or starting a vehicle engine) can be performed in step 63. If a specific identity is not authenticated in step 62, then the ID obtained in step 61 is checked against a list of communal group IDs in step 64. An identified communal group ID is used in step 65 to update parameters used for the power transfer. If a communal group ID was not obtained in step 61, then a check is performed in step 66 to determine whether another type of "communal group" event is present, such as an anonymous group based on the location of the vehicle and/or the time of day. If the conditions for providing anonymous charging are detected, then the power transfer parameters may be accordingly updated in step 65. Otherwise, charging is stopped at step 67.

Communal group IDs may be determined in advance and programmed into a vehicle controller during vehicle manufacturing. Such communal group IDs can then be published for incorporation into mobile wireless devices (e.g., as part of a software application to be installed in a user's smartphone). A user interface in the vehicle is preferably configured to conduct a setup operation with the vehicle user which allows the user to enable or disenable the pre-established communal group IDs and/or to modify any associated charging parameters.

Additionally, a dynamic system for establishing, modifying, and distributing communal group IDs and the devices associated with each communal group ID can be provided as shown in FIG. 6. An administrative entity (e.g., a vehicle manufacturer) may provide a central server 70 for storing a database 71 of communal group IDs. Pre-established communal group IDs may include a fleet ID (e.g., all vehicles of a certain vehicle manufacturer, all vehicles of a certain model, or any subset of these). A user/vehicle 73 and a mobile device 74 may be in wireless communication with central server 70 to access pre-existing group IDs and, in some embodiments, to add new group IDs for customized groups. A database 72 containing lists of members of respective communal groups may also be stored on central server 70 to enable mobile devices to retrieve group IDs which are available to them, for example.

Figure 7:
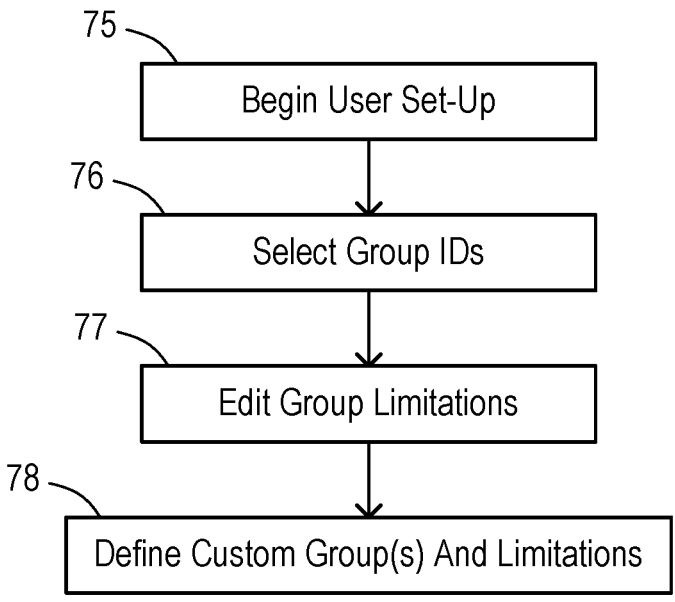
FIG. 7 is a flowchart showing a user setup process for configuring communal groups.

FIG. 7 shows a method of configuring a vehicle controller for charging operations according to communal groups to which a vehicle user wishes to extend the availability of wireless charging. In step 75, the user initiates a set-up routine (e.g., via a menu on an HMI). In step 76, the user selectably enables or disables pre-established communal group IDs. In step 77, the user may edit respective limitations imposed on charging availability according to the selected group IDs. The limitations may include predetermined parameters concerning charging metrics such as timespan of charging, geographic location, time-of-day, and minimum vehicle battery state of charge. In step 78, the user may define custom group IDs and limitations (e.g., enabling anonymous charging while in the user's garage).

What is claimed is:

1. A vehicle for providing wireless charging to a mobile wireless device outside of the vehicle, comprising:
   a perimeter interface responsive to a request action by a person outside the vehicle to initiate charging of the mobile wireless device;
   a wireless power transmitter configured to remotely charge the mobile wireless device;

a wireless transceiver configured to provide a wireless communication link with the mobile wireless device; and
a controller coupled to the perimeter interface, the wireless power transmitter, and the wireless transceiver, wherein the controller is configured to respond to the request action detected by the perimeter interface by (A) attempting one or more times to communicate with the mobile wireless device until a link is established, (B) before the link is established, then activating the wireless power transmitter to remotely charge the mobile wireless device, (C) when the link is established and while the wireless power transmitter remotely charges the mobile wireless device, then determining whether the mobile wireless device corresponds to a pre-established communal group, and (D) deactivating the wireless power transmitter when the mobile wireless device does not correspond to a pre-established communal group.

2. The vehicle of claim 1, wherein the determination of whether the mobile wireless device corresponds to a pre-established communal group is comprised of receiving a communal group ID from the mobile wireless device and comparing the received communal group ID to a plurality of stored communal group IDs.

3. The vehicle of claim 2, wherein the plurality of stored communal group IDs include user-selected communal group IDs.

4. The vehicle of claim 2, wherein the plurality of stored communal group IDs include manufacturer-defined communal group IDs.

5. The vehicle of claim 1, wherein the controller is further configured to (E) continue activating the wireless power transmitter according to predetermined parameters corresponding to the pre-established communal group.

6. The vehicle of claim 1, wherein the predetermined parameters include making charging available according to at least one situational metric selected from a group comprising timespan of charging, geographic location, time-of-day, and vehicle battery state of charge.

7. The vehicle of claim 1, wherein the pre-established communal group is comprised of a fleet of vehicles.

8. The vehicle of claim 7, wherein the fleet of vehicles have a common manufacturer.

9. The vehicle of claim 1, wherein the controller is further configured to:
   determine that the mobile wireless device is an unrecognized mobile device; and
   continue activating the wireless power transmitter according to predetermined restrictions for unrecognized mobile devices.

10. The vehicle of claim 1, wherein the predetermined restrictions for unrecognized mobile devices comprise at least one of: (i) a restriction based on a GPS location of the vehicle, (ii) a restriction based on a time of day, and (iii) a restriction based on a state-of-charge of a battery of the vehicle.

11. A method of providing wireless charging to a mobile wireless device outside of a vehicle, comprising the steps of:
   detecting, by a perimeter interface of the vehicle, a request action by a person outside the vehicle to initiate charging of the mobile wireless device;
   causing, by a controller of the vehicle, a wireless transceiver in the vehicle to attempt one or more times to communicate with the mobile wireless device until a link is established;

causing, by the controller, before the link is established, a wireless power transmitter of the vehicle to activate to remotely charge the mobile wireless device;

determining, by the controller, when the link is established and while the wireless power transmitter remotely charges the mobile wireless device, whether the mobile wireless device corresponds to a pre-established communal group; and deactivating, by the controller, the wireless power transmitter when the mobile wireless device does not correspond to a pre-established communal group.

12. The method of claim 11, wherein the determination of whether the mobile wireless device corresponds to a pre-established communal group is comprised of receiving a communal group ID from the mobile wireless device and comparing the received communal group ID to a plurality of stored communal group IDs.

13. The method of claim 12, wherein the plurality of stored communal group IDs include user-selected communal group IDs.

14. The method of claim 12, wherein the plurality of stored communal group IDs include manufacturer-defined communal group IDs.

15. The method of claim 11, further comprising the step of continuing to activate the wireless power transmitter according to predetermined parameters corresponding to the pre-established communal group.

16. The method of claim 11, wherein the predetermined parameters include making charging available according to at least one situational metric selected from a group comprising timespan of charging, geographic location, time-of-day, and vehicle battery state of charge.

17. The method of claim 11, wherein the pre-established communal group is comprised of a fleet of vehicles.

18. The method of claim 11, wherein the fleet of vehicles have a common manufacturer.

19. The method of claim 11, further comprising:

determining, by the controller, that the mobile wireless device is an unrecognized mobile device; and causing, by the controller, the wireless power transmitter to continue to activate according to predetermined restrictions for unrecognized mobile devices.

20. The method of claim 11, wherein the predetermined restrictions for unrecognized mobile devices comprise at least one of: (i) a restriction based on a GPS location of the vehicle, (ii) a restriction based on a time of day, and (iii) a restriction based on a state-of-charge of a battery of the vehicle.

* * * * *